US012731244B2

(12) United States Patent
Kasahara

(10) Patent No.: US 12,731,244 B2

(45) Date of Patent: Sep. 8, 2026

(54) INSPECTION SYSTEM AND METHOD FOR CONTROLLING INSPECTION SYSTEM

(71) Applicant: CANON KABUSHIKI KAISHA, Tokyo (JP)

(72) Inventor: Aya Kasahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 18/356,927

(22) Filed: Jul. 21, 2023

(65) Prior Publication Data

US 2024/0037730 A1 Feb. 1, 2024

(30) Foreign Application Priority Data

Jul. 28, 2022 (JP) ................................ 2022-120176

(51) Int. Cl.
*G06T 7/00* (2017.01)

(52) U.S. Cl.
CPC .... *G06T 7/001* (2013.01); *G06T 2207/30144* (2013.01)

(58) Field of Classification Search
CPC ...................... G06T 7/001; G06T 2207/30144
USPC ...... 382/112, 141; 358/1.18, 504; 356/237.2
See application file for complete search history.

(56) References Cited

U.S. PATENT DOCUMENTS 7,123,356 B1 * 10/2006 Stokowski ....... G01N 21/95607 430/5
7,545,962 B2 * 6/2009 Peirce .................... G06V 40/10 713/186
12,380,552 B2 * 8/2025 Ochiai .................... G06T 7/001
2010/0188714 A1 * 7/2010 Yamakawa ............. G06T 7/001 358/504
2013/0114102 A1 * 5/2013 Yamamoto ........... G06V 10/245 358/1.14
2014/0168709 A1 * 6/2014 Tokumaru ............... G06T 7/001 358/1.18
2021/0073967 A1 * 3/2021 Imai ........................ G06T 7/001
2021/0141577 A1 * 5/2021 Ito ......................... G06F 3/1256
2021/0397386 A1 * 12/2021 Hayashi ................ G06F 3/1282
2022/0150375 A1 * 5/2022 Watabe ................. G06T 7/0004
2022/0215524 A1 * 7/2022 Hirano ................. G01N 21/956
2022/0311890 A1 * 9/2022 Kagawa ............. H04N 1/00005
2022/0318977 A1 * 10/2022 Ishii ...................... G06T 7/0008
2023/0252618 A1 * 8/2023 Murakami ......... H04N 1/00334 382/141
2023/0281796 A1 * 9/2023 Kazumi .................. G06T 7/001 358/1.14

FOREIGN PATENT DOCUMENTS

JP 2021115744 A 8/2021

* cited by examiner

*Primary Examiner* — Kathleen Y Dulaney

(74) *Attorney, Agent, or Firm* — Canon U.S.A., Inc. IP Division

(57) ABSTRACT

An inspection system includes a storage unit configured to store one or more inspection settings and one or more reference images, a reception unit configured to receive data for specifying a first inspection setting and a first reference image from among the one or more inspection settings and the one or more reference images stored in the storage unit, and an inspection unit configured to receive a scanned image obtained by scanning a print product and inspect the scanned image based on the first inspection setting and the first reference image specified by the data received by the reception unit.

10 Claims, 13 Drawing Sheets

0102
0301
0302
0303
0304
0305
0306
0307
0104
0103
0308
0314
0310
0311
0309
0313
0312
0101
0315
0316
0317
0319
0106
0318
0321
0323
0322
0324
0320
0107

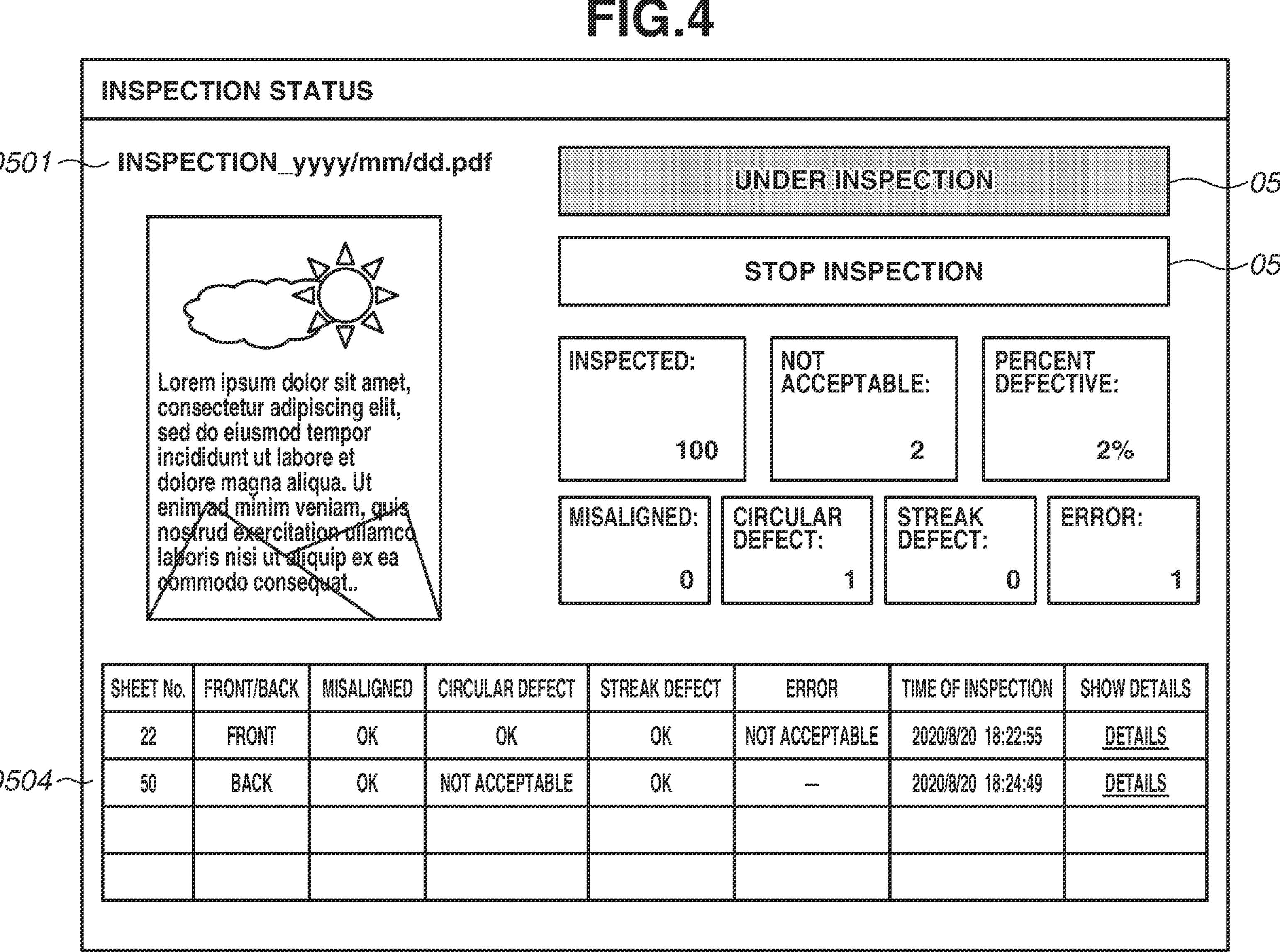
FIG.4
INSPECTION STATUS
0501
INSPECTION_yyyy/mm/dd.pdf
UNDER INSPECTION
0503
STOP INSPECTION
0502
Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat..
INSPECTED: 100
NOT ACCEPTABLE: 2
PERCENT DEFECTIVE: 2%
MISALIGNED: 0
CIRCULAR DEFECT: 1
STREAK DEFECT: 0
ERROR: 1
0504
SHEET No. | FRONT/BACK | MISALIGNED | CIRCULAR DEFECT | STREAK DEFECT | ERROR | TIME OF INSPECTION | SHOW DETAILS
22 | FRONT | OK | OK | OK | NOT ACCEPTABLE | 2020/8/20 18:22:55 | DETAILS
50 | BACK | OK | NOT ACCEPTABLE | OK | — | 2020/8/20 18:24:49 | DETAILS START
S801
IS OPERATION "Only printing"?
YES
NO
S802
DOES PRESET INCLUDE REFERENCE IMAGES?
YES
NO
S803
TRANSMIT REFERENCE IMAGE REGISTRATION JOB
S804
NO
IS REFERENCE IMAGE REGISTRATION COMPLETION NOTIFICATION RECEIVED?
YES
S805
NO
IS OPERATION "Registration & printing"?
YES
S806
TRANSMIT MAIN PRINT JOB
FINISH

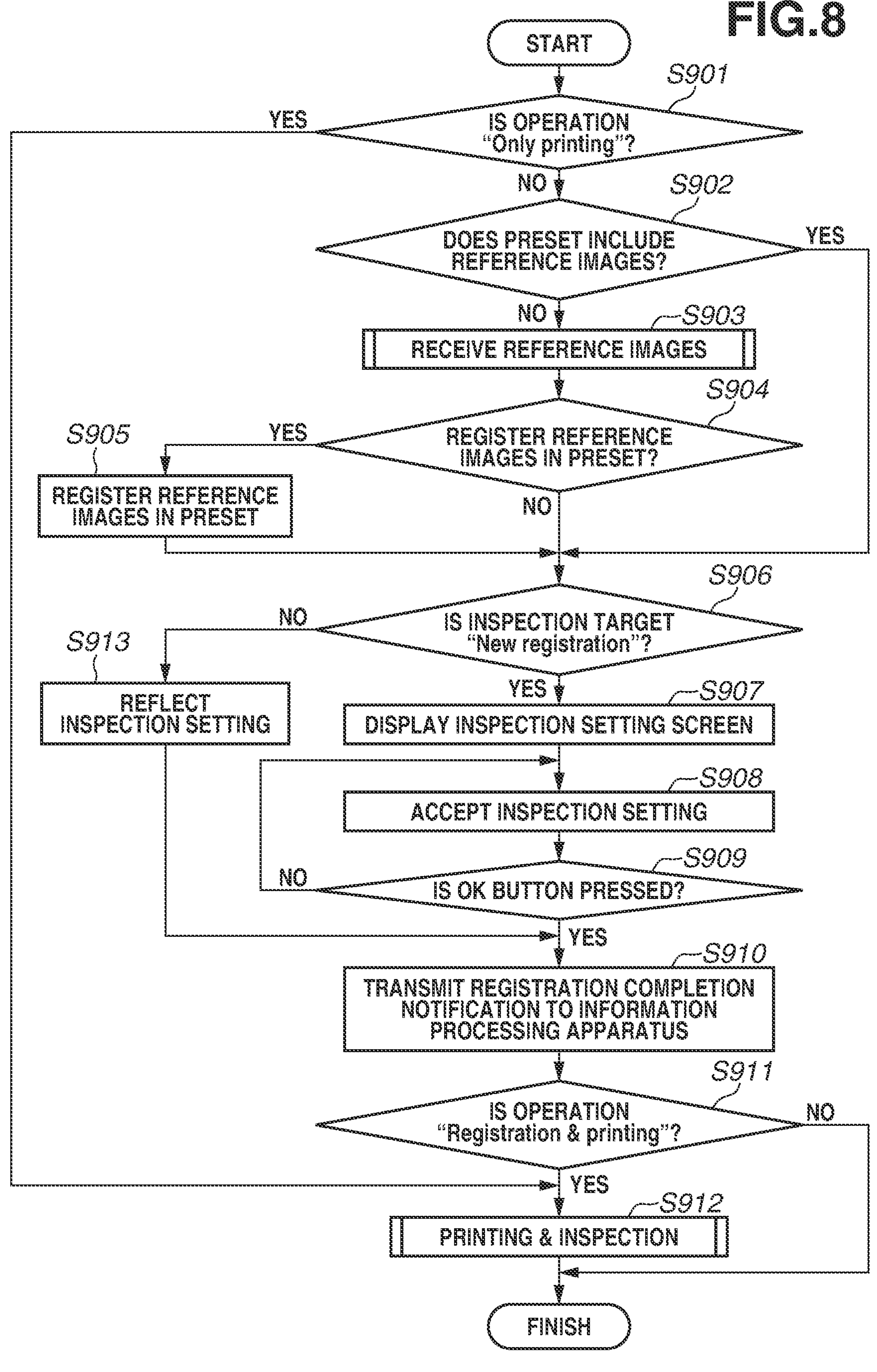
FIG.8
START
S901
IS OPERATION "Only printing"?
YES
NO
S902
DOES PRESET INCLUDE REFERENCE IMAGES?
YES
NO
S903
RECEIVE REFERENCE IMAGES
S904
REGISTER REFERENCE IMAGES IN PRESET?
YES
S905
REGISTER REFERENCE IMAGES IN PRESET
NO
S906
IS INSPECTION TARGET "New registration"?
NO
S913
REFLECT INSPECTION SETTING
YES
S907
DISPLAY INSPECTION SETTING SCREEN
S908
ACCEPT INSPECTION SETTING
S909
IS OK BUTTON PRESSED?
NO
YES
S910
TRANSMIT REGISTRATION COMPLETION NOTIFICATION TO INFORMATION PROCESSING APPARATUS
S911
IS OPERATION "Registration & printing"?
NO
YES
S912
PRINTING & INSPECTION
FINISH

FIG.9B

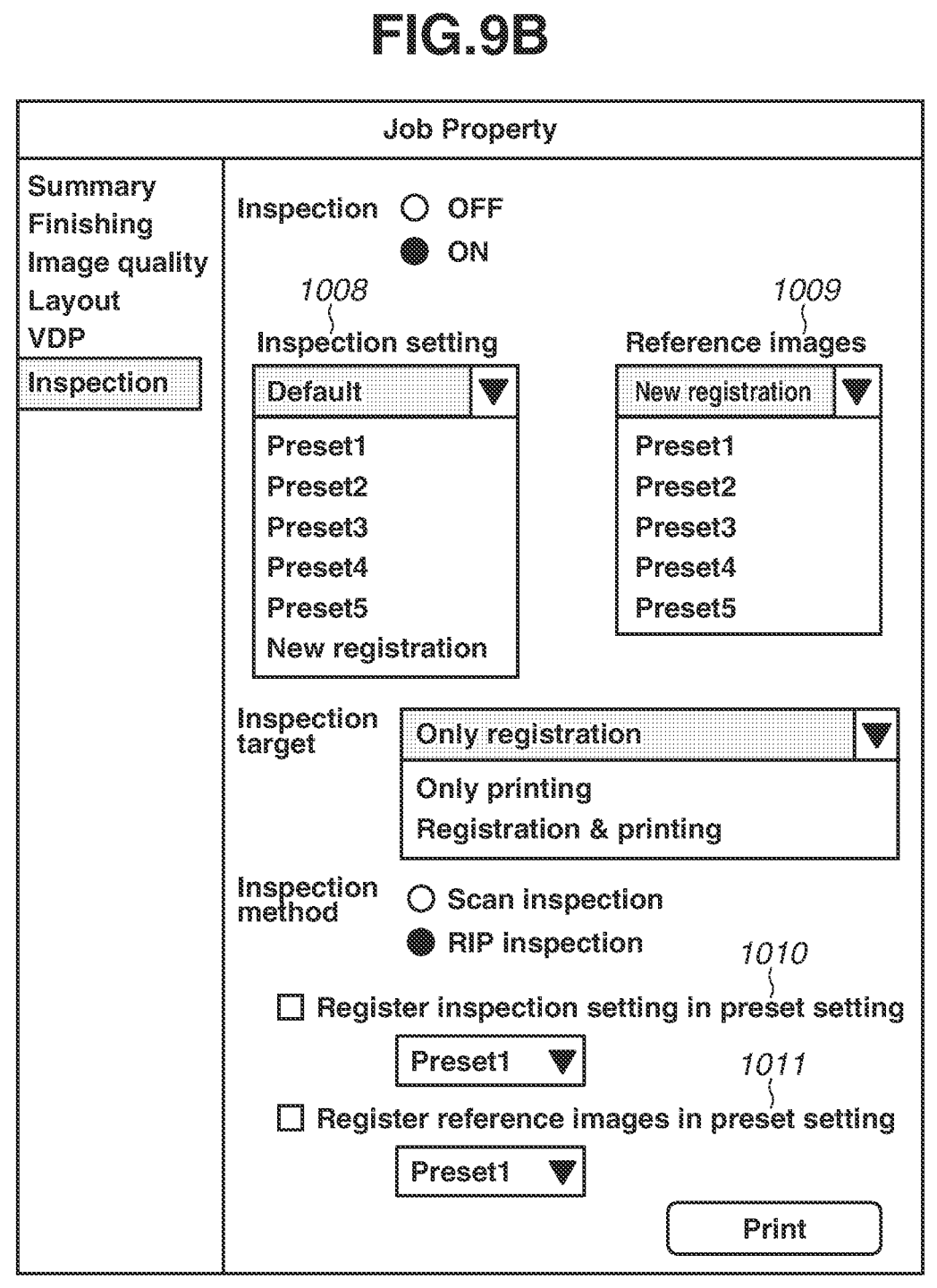

Job Property

Summary
Finishing
Image quality
Layout
VDP
Inspection

Inspection ○ OFF ● ON

1008
Inspection setting
Default
Preset1
Preset2
Preset3
Preset4
Preset5
New registration 1009
Reference images
New registration
Preset1
Preset2
Preset3
Preset4
Preset5

Inspection target
Only registration
Only printing
Registration & printing

Inspection method ○ Scan inspection ● RIP inspection

1010
☐ Register inspection setting in preset setting
Preset1

1011
☐ Register reference images in preset setting
Preset1

Print

FIG.10A

| PresetNo | INSPECTION SETTING | REFERENCE IMAGE |
|---|---|---|
| Preset1 | SETTING 1 | IMAGE A |
| Preset2 | SETTING 1 | IMAGE B |
| Preset3 | SETTING 2 | IMAGE C |
| Preset4 | SETTING 3 | IMAGE C |
| Preset5 | SETTING 4 | NOT REGISTERED |

FIG.10B

| INSPECTION SETTING Preset | REFERENCE IMAGE Preset |
|---|---|
| INSPECTION SETTING_Preset1 | REFERENCE IMAGE_Preset1 |
| INSPECTION SETTING_Preset2 | REFERENCE IMAGE_Preset2 |
| INSPECTION SETTING_Preset3 | REFERENCE IMAGE_Preset3 |
| INSPECTION SETTING_Preset4 | REFERENCE IMAGE_Preset4 |
| INSPECTION SETTING_Preset5 | REFERENCE IMAGE_Preset5 |

INSPECTION SYSTEM AND METHOD FOR CONTROLLING INSPECTION SYSTEM

BACKGROUND

Field of the Disclosure

The present disclosure relates to an inspection system and a method for controlling an inspection system.

Description of the Related Art

Inspection apparatuses that read a print product printed by a printing apparatus and inspect quality have been known. The inspection apparatuses can detect image defects such as stain and omission of printing, character errors, and barcode quality.

Such inspections are performed by comparing a non-defective image registered as a reference image and the print product. For that purpose, the reference image is initially registered in the inspection apparatus. The processing for this registration will be referred to as a reference image registration job. When the registration of the reference image is finished, the user performs inspection setting to set areas and thresholds for detecting defects in a main print job with respect to the reference image. When the inspection setting is finished, a main print job where the main print product is compared with the registered reference image to detect a defect is performed. As employed herein, a print job where an inspection apparatus performs inspection will be referred to as an inspection job. The inspection job is performed in the following three steps:

Execution of the reference image registration job,

Inspection setting, and

Execution of the print job.

Japanese Patent Application Laid-Open No. 2021-115744 discusses a technique for accepting a user's input with respect to a reference image as a method for performing inspection setting.

SUMMARY

According to embodiments of the present disclosure, an inspection system includes a storage unit configured to store one or more inspection settings and one or more reference images, a reception unit configured to receive data for specifying a first inspection setting and a first reference image from among the one or more inspection settings and the one or more reference images stored in the storage unit, and an inspection unit configured to receive a scanned image obtained by scanning a print product and inspect the scanned image based on the first inspection setting and the first reference image specified by the data received by the reception unit.

Further features of the present disclosure will become apparent from the following description of exemplary embodiments with reference to the attached drawings.

BRIEF DESCRIPTION OF THE DRAWINGS

FIG. 4 illustrates an example of an inspection status screen displayed on the inspection apparatus during inspection.

FIG. 8 is an example of an entire operation flowchart of the inspection apparatus according to the exemplary embodiment.

FIG. 9B illustrates another example of the print setting screen displayed on the information processing apparatus.

FIG. 10A illustrates examples of presets stored in the inspection apparatus. FIG. 10B illustrates other examples of the presets stored in the inspection apparatus.

DESCRIPTION OF THE EMBODIMENTS

Exemplary embodiments of the present disclosure will be described below with reference to the drawings. It will be understood that exemplary embodiments of the present disclosure are applicable to a single device or an inspection apparatus including a plurality of devices as long as the functions according to the exemplary embodiments are implemented, unless otherwise specified. Exemplary embodiments of the present disclosure are also applicable to an inspection apparatus that is connected to perform processing via a network, such as a local area network (LAN) and a wide area network (WAN), as long as the functions according to the exemplary embodiment are implemented, unless otherwise specified. In other words, the system configuration described in the following exemplary embodiment, where various terminals are connected to each other, is just an example. It will be understood that there can be various configuration examples depending on the applications and purposes.

Figure 1:
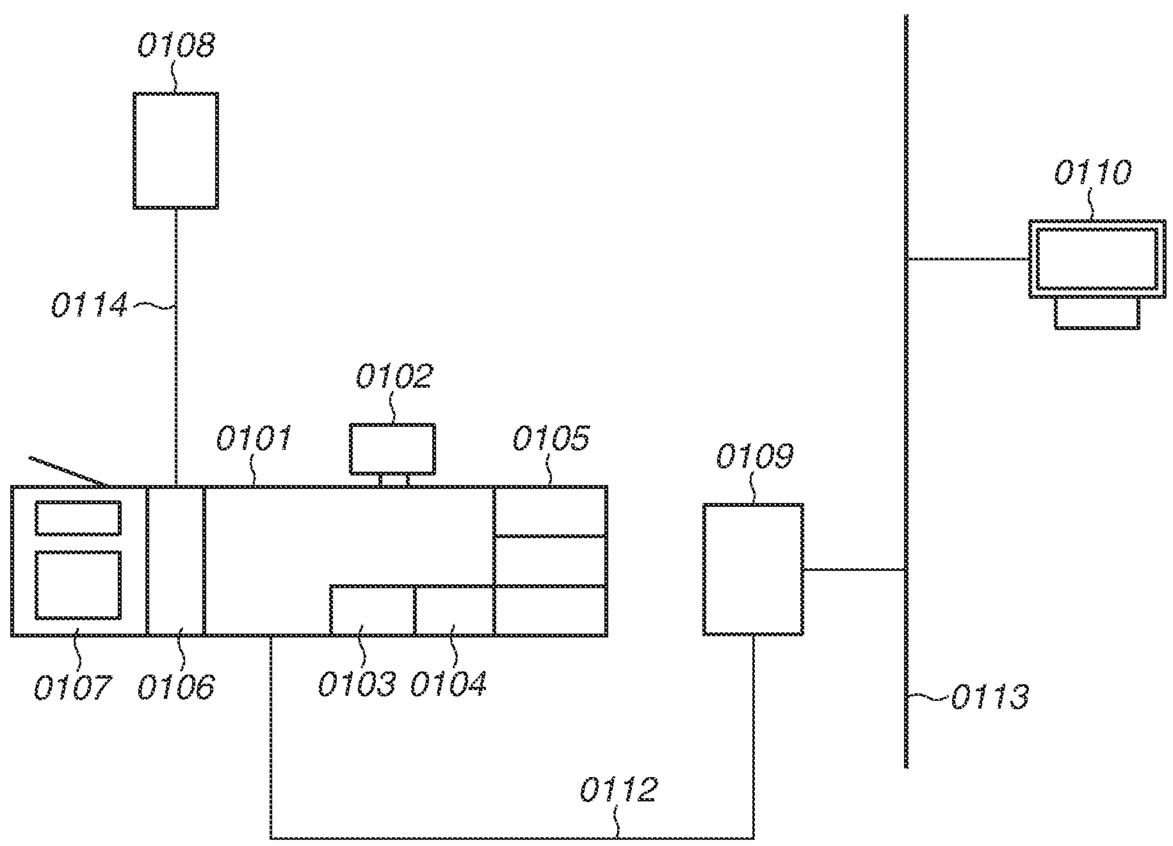
FIG. 1 is an example of a schematic diagram illustrating a configuration of an information processing apparatus, an inspection apparatus, and a printing apparatus.

FIG. 1 is a schematic diagram illustrating a configuration of an inspection system according to the present exemplary embodiment, or an information processing apparatus, an inspection apparatus, and a printing apparatus. The printing apparatus according to the present exemplary embodiment will be described by using an electrophotographic printing apparatus, whereas the printing apparatus according to the present exemplary embodiment can be a printing apparatus of other image forming methods like inkjet and offset printing apparatuses.

A printing apparatus 0101 is connected to an information processing apparatus 0109 via a cable 0112. The information processing apparatus 0109 is communicably connected to a client computer 0110 via a network 0113. The printing apparatus 0101 includes a user interface (UI) panel 0102, a feed deck 0103, and a feed deck 0104. An option deck 0105 including three stages of feed decks is further connected.

The printing apparatus 0101 is an electrophotographic printing apparatus, for example. The UI panel 0102 is an UI including a capacitive touchscreen, for example.

The printing apparatus 0101 further includes an inspection unit 0106 and a large-capacity stacker 0107. The inspection unit 0106 is connected to an inspection apparatus 0108 via a cable 0114. The large-capacity stacker 0107 includes a main tray and a top tray. Several thousands of sheets can be stacked in the main tray at a time.

A print job is generated by the client computer 0110, transmitted to the information processing apparatus 0109 via the network 0113, and managed by the information processing apparatus 0109. The print job is then transmitted from the information processing apparatus 0109 to the printing apparatus 0101 via the cable 0112, and the printing apparatus 0101 performs processing for printing on sheets. In another configuration, the print job can be generated and managed by the information processing apparatus 0109, transmitted to the printing apparatus 0101 via a network instead of the cable 0112, and managed by the printing apparatus 0101.

In another configuration, the client computer 0110, the information processing apparatus 0109, and the inspection apparatus 0108 can be connected to the cable 0112 and communicably connected to the printing apparatus 0101. In another configuration, the inspection apparatus 0108 can also be connected to the information processing apparatus 0109 and the client computer 0110 via the network 0113. In other words, the mode of connection of the printing apparatus 0101, the information processing apparatus 0109, and the client computer 0110 described in the present exemplary embodiment is just an example, and it will be understood that there are various connection modes other than that described in the present exemplary embodiment.

Aside from the inspection unit 0106 and the large-capacity stacker 0107, a finisher capable of stapling, a folding machine, and/or a bookbinding machine can be connected to the printing apparatus 0101.

Figure 2:
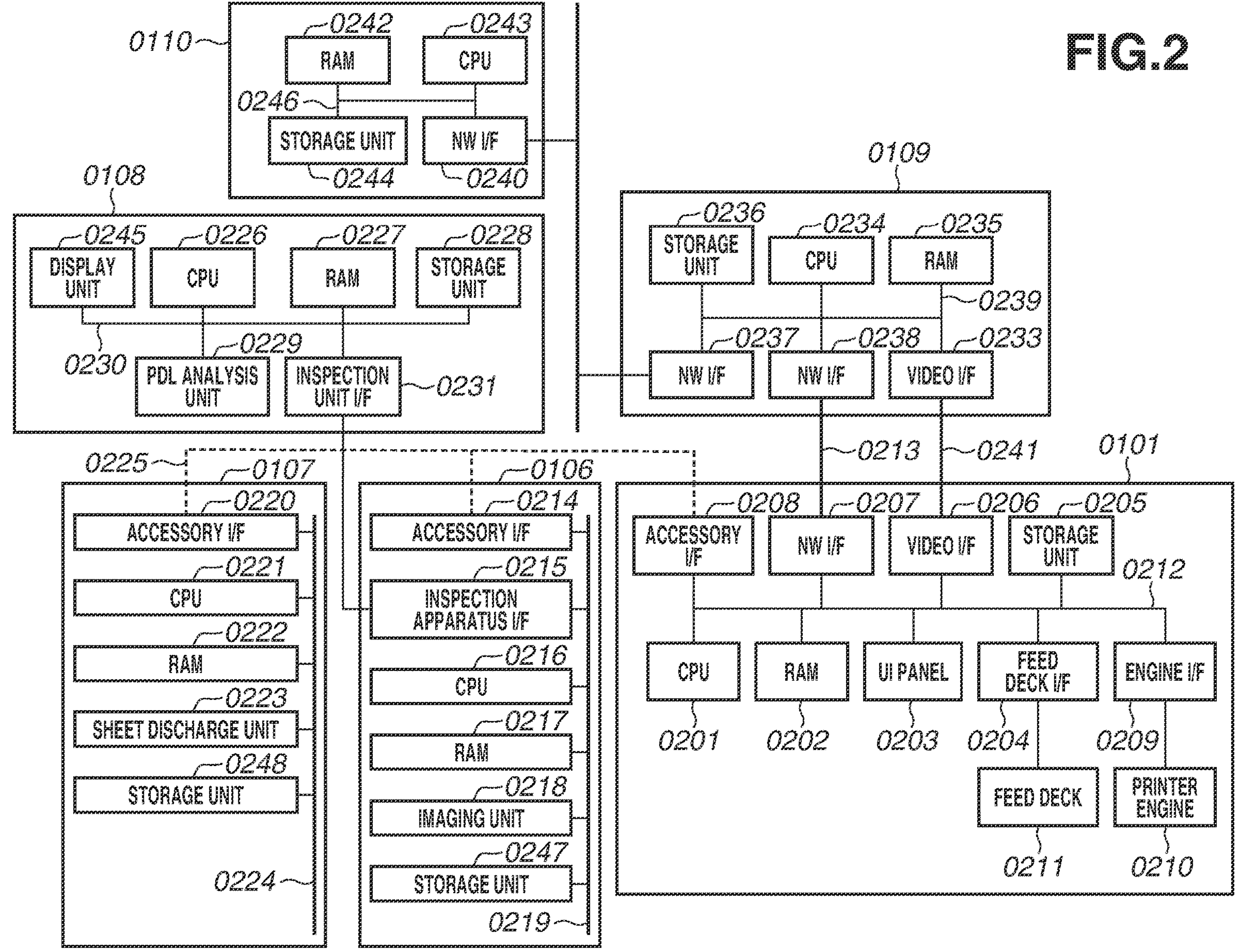
FIG. 2 is an example of a block diagram illustrating a configuration of the information processing apparatus, the inspection apparatus, and the printing apparatus.

FIG. 2 is a block diagram illustrating a control configuration of the printing apparatus 0101, the inspection apparatus 0108, the large-capacity stacker 0107, the information processing apparatus 0109, and the client computer 0110 according to the present exemplary embodiment.

A central processing unit (CPU) 201 governs control and calculation of various components in the printing apparatus 0101 via a system bus 0212. The CPU 0201 governs execution of programs stored in a storage unit 0205 and loaded into a random access memory (RAM) 0202. The RAM 0202 is a kind of typical volatile storage device directly accessible from the CPU 0201. The RAM 0202 is used as a work area of the CPU 0201 or other temporary data storage areas. The storage unit 0205 functions as a temporary storage area and a work memory during operation of the printing apparatus 0101.

An engine interface (I/F) 0209 governs communication with and control of a printer engine 0210. A feed deck I/F 0204 governs communication with and control of a feed deck 0211. The feed deck 0211 refers collectively to the hardware configurations of the feed decks 0103 and 0104 and the option deck 0105. A UI panel 0203 refers to the hardware configuration of the UI panel 0102. The UI panel 0203 is a UI for operating the printing apparatus 0101 in general. In the present exemplary embodiment, the UI panel 0203 includes a capacitive touchscreen.

A network I/F (hereinafter, NW I/F) 0207 is connected to an NW I/F 0238 of the information processing apparatus 0109 via a cable 0213, and governs communication between the information processing apparatus 0109 and the printing apparatus 0101. In this example, the NW I/Fs 0207 and 0238 connected to the system bus 0212 and a system bus 0239 are directly connected to each other, whereas the information processing apparatus 0109 and the printing apparatus 0101 can be connected by a network, for example. The connection form is not limited in particular. A video I/F 0206 is connected to a video I/F 0233 via a video cable 0241, and governs communication of image data between the information processing apparatus 0109 and the printing apparatus 0101.

The connection I/F of the information processing apparatus 0109 with the printing apparatus 0101 can be configured to integrate the functions of the NW I/F 0238 and the video I/F 0233. The connection I/F of the printing apparatus 0101 with the information processing apparatus 0109 can be configured to integrate the functions of the NW I/F 0207 and the video I/F 0206.

An accessory I/F 0208 connects to an accessory I/F 0214 and an accessory I/F 0220 via a cable 0225. In other words, the printing apparatus 0101, the inspection unit 0106, and the large-capacity stacker 0107 communicate with each other via the accessory I/Fs 0208, 0214, and 0220.

A CPU 0216 governs control and calculation of various components in the inspection unit 0106 via a system bus 0219, and execution of programs stored in a storage unit 0247 and loaded into a RAM 0217. The RAM 0217 is a kind of typical volatile storage device directly accessible from the CPU 0216. The RAM 0217 is used as a work area of the CPU 0216 or other temporary data storage areas. The storage unit 0247 functions as a temporary storage area and a work memory during operation of the inspection apparatus 0108. An inspection apparatus I/F 0215 connects to an inspection unit I/F 0231 via a cable. In other words, the inspection unit 0106 communicates with the inspection apparatus 0108 via the inspection apparatus I/F 0215 and the inspection unit I/F 0231.

An imaging unit 0218 has an imaging function equipped with a contact image sensor (CIS), for example. The imaging unit 0218 captures an image of a sheet passing through the inspection unit 0106, and transmits the captured image to the inspection apparatus 0108 via the inspection apparatus I/F 0215. Note that the CIS is just an example of the sensor of the imaging unit 0218, and other types of sensors, such as a charge-coupled device (CCD) image sensor, can also be used. The imaging method is not limited in particular. There are two purposes for the transmission of the captured image. One is to capture an image of a print product of a print job to be inspected, and transmit the image to the inspection apparatus 0108 for inspection regardless of the inspection method. The other is to, if the inspection method is scan inspection, print one or more copies of the print job to be inspected, and capture an image or images of the print product to generate a reference image prior to the print job, and transmit the reference image to the inspection apparatus 0108. The inspection apparatus 0108 stores the transmitted image in the storage unit 0228 as the reference image.

A CPU 0221 governs control and calculation of various components in the large-capacity stacker 0107 via a system bus 0224, and execution of programs stored in a storage unit 0248 and loaded into a RAM 0222. The RAM 0222 is a kind of typical volatile storage device directly accessible from the CPU 0221, and used as a work area of the CPU 0221 or other temporary data storage areas. The storage unit 0248 functions as a temporary storage area and a work memory during operation of the inspection apparatus 0108. A sheet discharge unit 0223 governs sheet discharge operations to a main tray or a top tray, and monitoring and control of the stacking statuses of the main tray and the top tray.

A CPU 0226 governs control and calculation of various components in the inspection apparatus 0108 via a system bus 0230, and execution of programs stored in a storage unit 0228 and loaded into a RAM 0227. The RAM 0227 is a kind of typical volatile storage device directly accessible from the CPU 0226, and used as a work area of the CPU 0226 or other temporary data storage areas.

The storage unit 0228 functions as a temporary storage area and a work memory during operation of the inspection apparatus 0108. The storage unit 0228 stores inspection settings and reference images. The storage unit 0228 further stores information linking the inspection settings and reference images with preset numbers as illustrated in FIG. 10 to be described below. A page description language (PDL) analysis unit 0229 reads PDL data, such as Portable Document Format (PDF), PostScript, and Printer Command Language (PCL) data, received from the client computer 0110 or the information processing apparatus 0109, and performs interpretation processing. A display unit 0245 is a liquid crystal display connected to the inspection apparatus 0108, for example. The display unit 0245 accepts a user's input to the inspection apparatus 0108 as an acceptance unit, and displays the state of the inspection apparatus 0108.

A CPU 0234 governs control and calculation of various components in the information processing apparatus 0109 via the system bus 0239, and execution of programs stored in a storage unit 0236 and loaded into a RAM 0235. The RAM 0235 is a kind of typical volatile storage device directly accessible from the CPU 0234, and used as a work area of the CPU 0234 or other temporary data storage areas. The storage unit 0236 functions as a temporary storage area and a work memory during operation of the information processing apparatus 0109. An NW I/F 0237 is connected to an NW I/F 0240 via a network. The information processing apparatus 0109 communicates with the client computer 0110 via the NW I/Fs 0237 and 0240.

The inspection apparatus 0108 can include an NW I/F, and the information processing apparatus 0109 can be configured to communicate with the inspection apparatus 0108 via the NW OF and the NW I/F 0237. Suppose, for example, that the inspection method is raster image processor (RIP) inspection, and a RIP image for the printing apparatus 0101 to use in printing is used as a reference image. In such a case, the reference image can be transmitted to the inspection apparatus 0108 via the inspection apparatus I/F 0215. The reference image can also be transmitted to the inspection apparatus 0108 via the NW I/Fs 0207 and 0237 and the NW I/F of the inspection apparatus 0108.

A CPU 0243 governs control and calculation of various components in the client computer 0110 via a system bus 0246, and execution of programs stored in a storage unit 0244 and loaded into a RAM 0242. The RAM 0242 is a kind of typical volatile storage device directly accessible from the CPU 0243, and used as a work area of the CPU 0243 or other temporary data storage areas. The storage unit 0244 functions as a temporary storage area and a work memory during operation of the client computer 0110.

Figure 3:
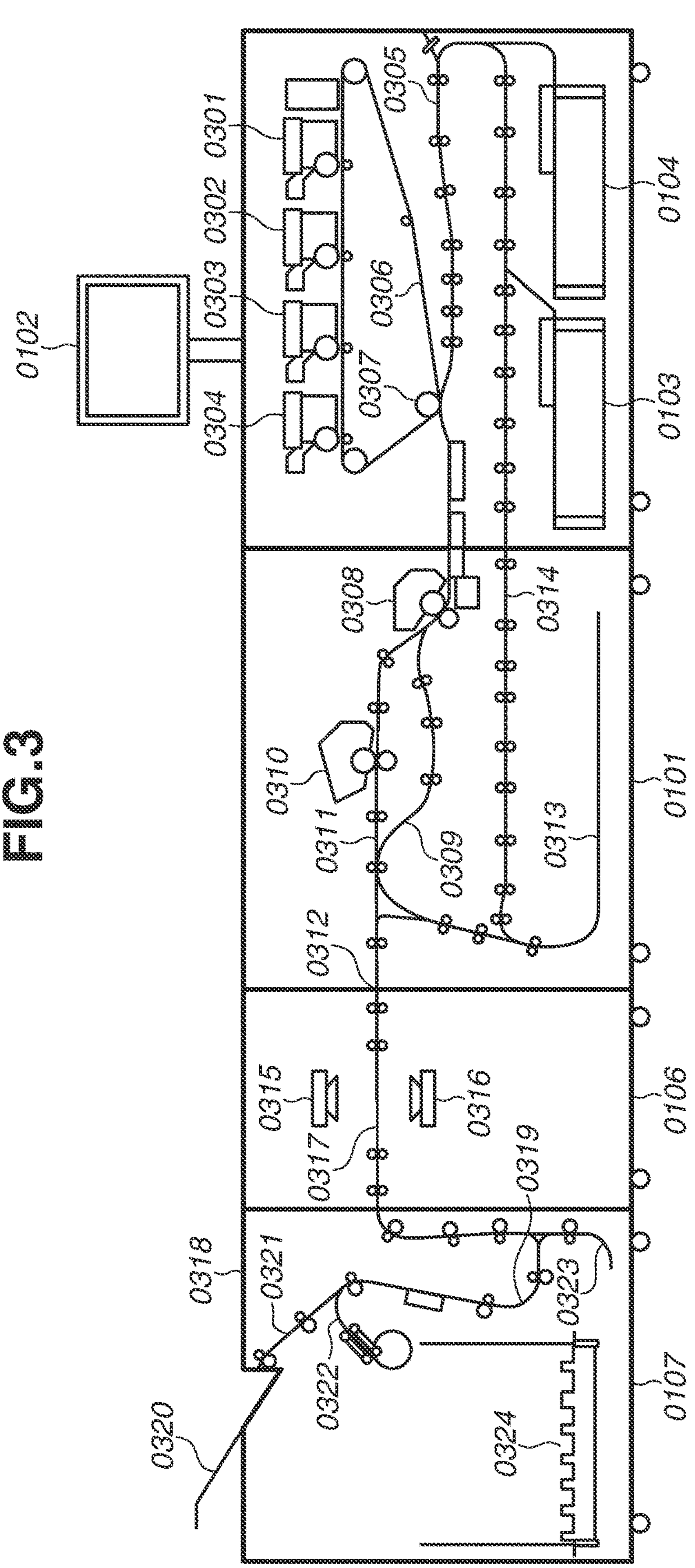
FIG. 3 is an example of a diagram illustrating an internal configuration of the information processing apparatus, an inspection unit, the printing apparatus, a large-capacity stacker.

FIG. 3 is a diagram illustrating an internal configuration of the printing apparatus 0101, the inspection unit 0106, and the large-capacity stacker 0107. The printing apparatus 0101 accepts the user's input via the UI panel 0102 or displays a printing state and a device state. The feed decks 0103 and 0104 can store various types of sheets. Each feed deck can separate only the topmost one of the stored sheets and convey the separated sheet to a sheet conveyance path 0305. To form a color image, developing stations 0301, 0302, 0303, and 0304 form toner images using yellow (Y), magenta (M), cyan (C), and black (K) color toners, respectively. The toner images formed here are primarily transferred to an intermediate transfer belt 0306. The intermediate transfer belt 0306 rotates clockwise in the diagram, and transfers the toner images to a sheet conveyed from the sheet conveyance path 0305 at a secondary transfer position 0307. A fixing unit 0308 includes a pressure roller and a heating roller. The sheet is passed through between the rollers, whereby the toner is melted and pressed to fix the toner images to the sheet. The sheet past the fixing unit 0308 is conveyed to a sheet conveyance path 0312 through a sheet conveyance path 0309. If additional melting and pressing for fixing is desirable depending on the sheet type, the sheet past the fixing unit 0308 is conveyed to a second fixing unit 0310 using the upper sheet conveyance path. After the additional melting and pressing is applied, the sheet is conveyed to the sheet conveyance path 0312 through a sheet conveyance path 0311. If an image formation mode is a two-sided mode, the sheet is conveyed to a sheet reversing path 0313. The sheet is reversed using the sheet reversing path 0313 and then conveyed to a two-sided conveyance path 0314, and the image of the second side is transferred at the secondary transfer position 0307.

The inspection unit 0106 includes CISs 0315 and 0316 that are opposed to each other. The CIS 0315 is a sensor for reading the upper side of the sheet, and the CIS 0316 the lower side of the sheet. The inspection unit 0106 scans the sheet using the CISs 0315 and 0316 at timing when the sheet conveyed to a sheet conveyance path 0317 reaches a predetermined position. The scanned images are transmitted to the inspection apparatus 0108 via the inspection apparatus I/F 0215 and the inspection unit I/F 0231. The CPU 0226 determines whether there is a defect in the received images, and notifies the inspection unit 0106 of the determination result via the inspection unit I/F 0231 and the inspection apparatus I/F 0215. The CPU 0216 notifies the large-capacity stacker 0107 of the received determination result via the accessory I/Fs 0214 and 0220.

The large-capacity stacker 0107 can stack a large volume of sheets. The large-capacity stacker 0107 includes a main tray 0324 as a tray for stacking sheets. The sheet past the inspection unit 0106 enters the large-capacity stacker 0107 through a sheet conveyance path 0319. The sheet is stacked in the main tray 0324 via the sheet conveyance path 0319 and a sheet conveyance path 0322. The large-capacity stacker 0107 further includes a top tray 0320 as a sheet discharge tray. The CPU 0221 discharges sheets from which a defect is detected by the inspection apparatus 0108 to the top tray 0320. In outputting a sheet to the top tray 0320, the sheet is conveyed from the sheet conveyance path 0319 to the top tray 0320 via a sheet conveyance path 0321. A reversing unit 0323 is intended to reverse a sheet. This reversing unit 0323 is used in stacking the sheet in the main tray 0324. The sheet to be stacked in the main tray 0324 is reversed once using the reversing unit 0323 so that the orientation of the sheet entered and that of the sheet stacked are the same. In conveying the sheet to the top tray 0320, the reversing operation using the reversing unit 0323 is not performed since the sheet is simply discharged and stacked without being flipped.

FIG. 4 illustrates an inspection status screen displayed on the display unit 0245 during execution of an inspection. An inspection status screen 0501 is displayed on the display unit 0245, accepts execution and stop of the inspection, and displays an inspection status. An inspection button 0502 accepts the execution of the inspection and the stop of the inspection by the user.

If the inspection button 0502 is pressed, the character string on the inspection button 0502 changes to "stop inspection", and an inspection status 0503 to "under inspection". If the inspection button 0502 is pressed again, the character string on the inspection button 0502 changes to "start inspection", and the inspection status 0503 to "stopped". The character string on the inspection button 0502 and the inspection status 0503 are subsequently toggled each time the inspection button 0502 is pressed.

The inspection status screen 0501 displays the number of sheets inspected, the number of sheets of which the inspection result is not acceptable (fail), a percent defective, and the numbers of occurrences of causes for unacceptable inspection results in real time during the inspection. On the inspection status screen 0501, "error" indicates the number of errors or inspection results determined to not be acceptable by the inspection apparatus 0108 due to time-out because inspection is not completed within a predetermined inspection time. Each time an unacceptable inspection result occurs, the sheet number of the unacceptable inspection result, information about whether the side is the front or back, the cause of the unacceptable inspection result, the time of inspection, and a link to a detailed unacceptability screen (not illustrated) are added to an unacceptable inspection list 0504. If "details" is pressed, the display unit 0245 displays a screen (detailed unacceptability screen) where the captured image of the unacceptable inspection result and the position of the defect can be browsed. Examples of possible causes of the unacceptable inspection result displayed here include a misalignment, a circular defect (spot), and a streak defect (streak). A misalignment refers to a defect that all or part of the scanned image is found to deviate by comparison between the scanned image and the reference image. A circular defect refers to a state where only the scanned image includes a circular stain. A streak defect refers to a state where only the scanned image includes a streak-like or linear stain. The inspection apparatus 0108 can identify the type of detected defect from the features of the defect, and display the type on the unacceptable inspection list 0504. Note that such defects are just examples, and the types of detects detectable by the inspection apparatus 0108 are not limited thereto. For example, the inspection apparatus 0108 can determine that there is an image omission and add the image omission as an unacceptable inspection result if only the reference image is fully drawn and all or part of the scanned image is missing.

Processing characteristic of the present exemplary embodiment will now be described with reference to flowcharts. A program of the printing apparatus 0101 related to this procedure is stored in the storage unit 0205 of the printing apparatus 0101, read into the RAM 0202, and executed by the CPU 0201. A program of the inspection apparatus 0108 related to the procedure is stored in the storage unit 0228 of the inspection apparatus 0108, read into the RAM 0227, and executed by the CPU 0226. A program of the information processing apparatus 0109 related to the procedure is stored in the storage unit 0236 of the information processing apparatus 0109, read into the RAM 0235, and executed by the CPU 0234. A program of the client computer 0110 related to the procedure is stored in the storage unit 0244 of the client computer 0110, read into the RAM 0242, and executed by the CPU 0243.

Figure 5:
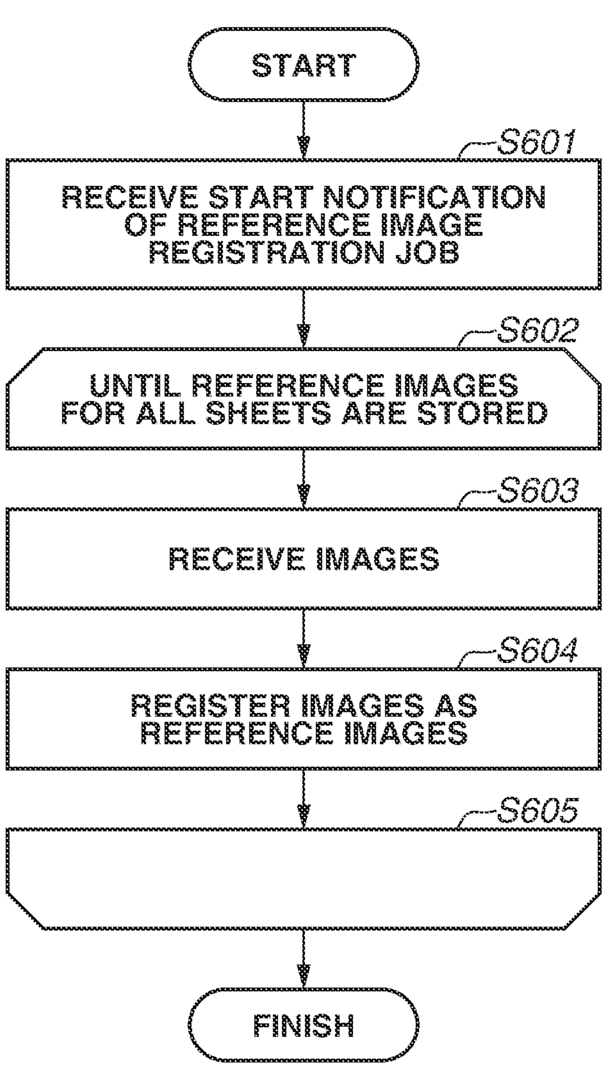
FIG. 5 is an example of an operation flowchart of the inspection apparatus during reference image registration.

FIG. 5 is an operation flowchart of the inspection apparatus 0108 in registering reference images for inspection. Reference images are generated by difference methods depending on two inspection methods, namely, scan inspection and RIP inspection.

Figure 9A:
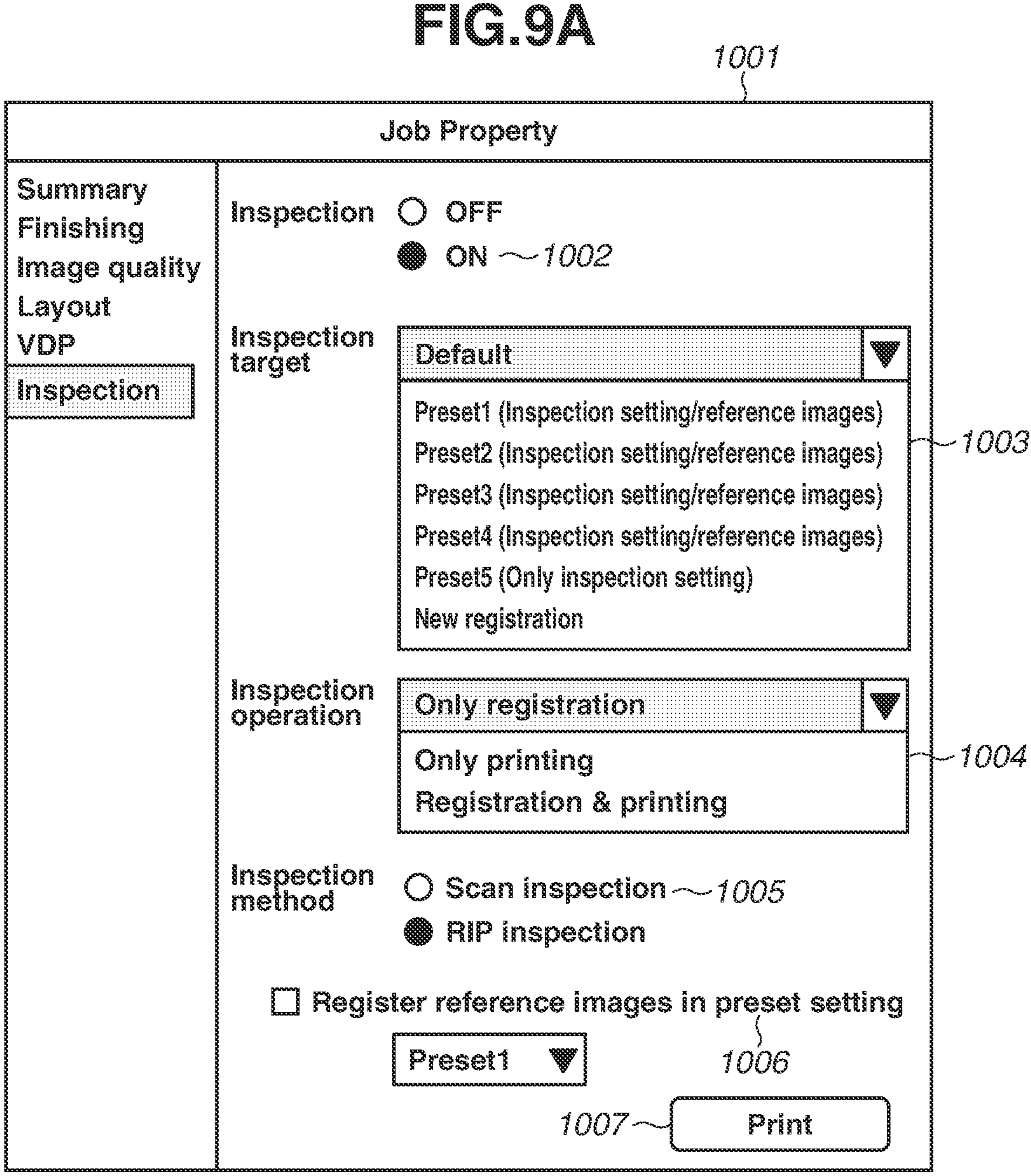
FIG. 9A illustrates an example of a print setting screen displayed on the information processing apparatus.

If an inspection method selected in an inspection method selection section 1005 of FIGS. 9A and 9B is the scan inspection, the printing apparatus 0101 initially prints the print job to be inspected. The inspection unit 0106 captures images of the print product printed on sheets by the printing apparatus 0101 to generate image data. The printing apparatus 0101 transmits the image data to the inspection apparatus 0108. The user checks that there is no stain or character error in the images displayed on the inspection apparatus 0108, and registers the images as reference images. In such a manner, the reference image registration method for the scan inspection registers image data obtained by scanning a print product in the inspection apparatus 0108 as reference images. The printing apparatus 0101 can print a plurality of copies, capture images thereof, and transmit the captured images to the inspection apparatus 0108, and combined images of the plurality of copies can be used as reference images.

If the inspection method selected in the inspection method selection section 1005 to be described with reference to FIG. 9A is the RIP inspection, the printing apparatus 0101 transmits generated RIP images to the inspection apparatus 0108. The RIP images here can be ones generated by a RIP apparatus other than the printing apparatus 0101 (for example, RIP software). In such a manner, the reference image registration method for the RIP inspection registers RIP images in the inspection apparatus 0108 as reference images.

The flowchart of FIG. 5 illustrates a procedure common for the scan and RIP inspections. In step S601, the inspection apparatus 0108 receives a start notification of a reference image registration job from the printing apparatus 0101. The processing proceeds to step S602, and the subsequent processing is repeated until reference images for all the sheets are stored in the storage unit 0228 of the inspection apparatus 0108.

In step S603, if the inspection method is the scan inspection, the inspection unit I/F 0231 receives images scanned by the CISs 0315 and 0316 from the inspection apparatus I/F 0215. If the inspection method is the RIP inspection, the inspection unit OF 0231 receives RIP images generated by the printing apparatus 0101 prior to printing from the inspection apparatus I/F 0215. The operations of the information processing apparatus 0109 and the printing apparatus 0101 for the two inspection methods, the scan inspection and the RIP inspection, will be described below with reference to FIG. 7. The inspection method is the method selected in the inspection method selection section 1005 to be described with reference to FIG. 9.

In step S604, the CPU 0226 registers the images received in step S603 in the RAM 0227 as reference images. The processing proceeds to step S605, and steps S602 to S605 are repeated until the images of all the sheets are read. If the images of all the sheets are read, the processing ends.

If the inspection method is the scan inspection, the inspection apparatus 0108 can read a plurality of images from the same page and register a combined result as a reference image, for example.

Figure 6:
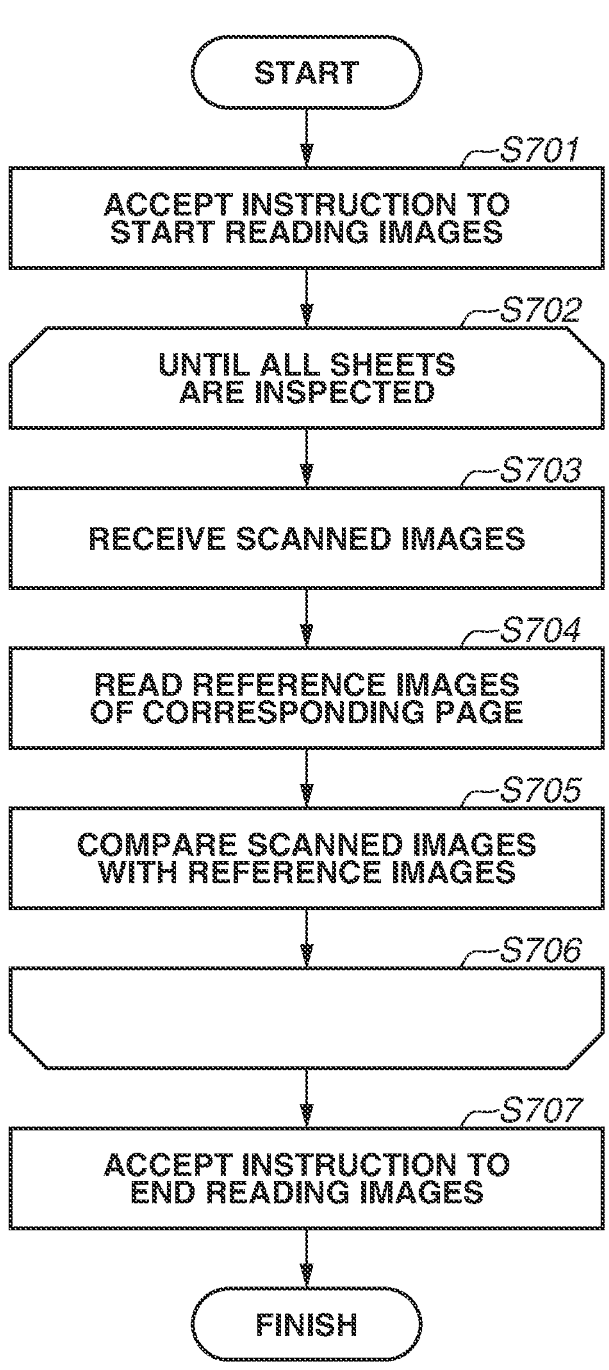
FIG. 6 is an example of an inspection operation flowchart of the inspection apparatus according to an exemplary embodiment.

FIG. 6 is an inspection operation flowchart of the inspection apparatus 0108. This procedure is started by the printing apparatus 0101 receiving a main print job from the information processing apparatus 0109.

In step S701, the CPU 0226 accepts an instruction to start reading images of the main print job. The processing proceeds to step S702. If there is a sheet to be inspected, the processing proceeds to step S703. In step S703, the inspection unit I/F 0231 receives images scanned by the CISs 0315 and 0316 from the inspection apparatus I/F 0215. The images are ones obtained by scanning a print result of the print job that is a product. The inspection apparatus 0108 performs inspection by comparing the scanned images with reference images determined according to the flowchart of FIG. 5 in advance. In step S704, the CPU 0226 reads the reference images of the corresponding page, registered in step S604 from the RAM 0227.

In step S705, the CPU 0226 compares the reference images read in step S704 and the scanned images to be inspected received in step S703. In this comparison operation, the CPU 0226 initially aligns the image positions of the reference images and the scanned images to be inspected, using characteristic points of the images as alignment reference points. The CPU 0226 then analyzes the four corners of the sheet in the scanned images to be inspected and the alignment reference points in the scanned images, and detects a misalignment of the images with respect to the sheet.

Next, the CPU 0226 compares the density values of the reference images and those of the scanned images to be inspected pixel by pixel. If, as a result, no difference is detected between the scanned images and the reference images, the CPU 0226 determines that the inspection result is OK. If a difference is detected, the CPU 0226 determines that the inspection result is not acceptable, and records the details of the unacceptable inspection result described with reference to FIG. 4 depending on the type of detect.

The processing proceeds to step S706, and steps S702 to S706 are repeated until all the sheets are inspected. If all the sheets are inspected, the processing proceeds to step S707. In step S707, the CPU 0226 accepts an instruction to end reading images from the user via the inspection button 0502 on the display unit 0245.

The foregoing procedure is just an example. For example, the instruction to start reading images for the user to issue from the display unit 0245 can be automatically implemented in an interlocked manner with an instruction to start printing from the printing apparatus 0101, the information processing apparatus 0109, or the client computer 0110, and the configuration is not restrictive. The instruction to end reading images for the user to issue from the display unit 0245 can be automatically implemented in an interlocked manner with the end of printing by the printing apparatus 0101, and the configuration is not restrictive.

Operations during the execution of an inspection job proposed in the present exemplary embodiment will now be described. A procedure where the information processing apparatus 0109, the inspection apparatus 0108, and the printing apparatus 0101 process the inspection job in an interlocked manner will be described with reference to FIGS. 8 to 12.

Initially, an operation for selecting the inspection method of the inspection job will be described with reference to FIG. 9A. FIG. 9A illustrates an example of a job property setting screen. An inspection method selection section 1001 is a screen that is displayed on the information processing apparatus 0109 and intended to accept a print job setting from the user. An inspection mode setting section 1002 accepts an instruction about whether to inspect the job from the user. If the user selects inspection "OFF" and presses a print button 1007, the printing apparatus 0101 performs a normal print operation. As employed herein, the normal print operation refers to printing without an inspection operation. If inspection "OFF" is selected, sections 1003 to 1006 can be grayed out to not accept the user's selection, for example.

Figure 11:
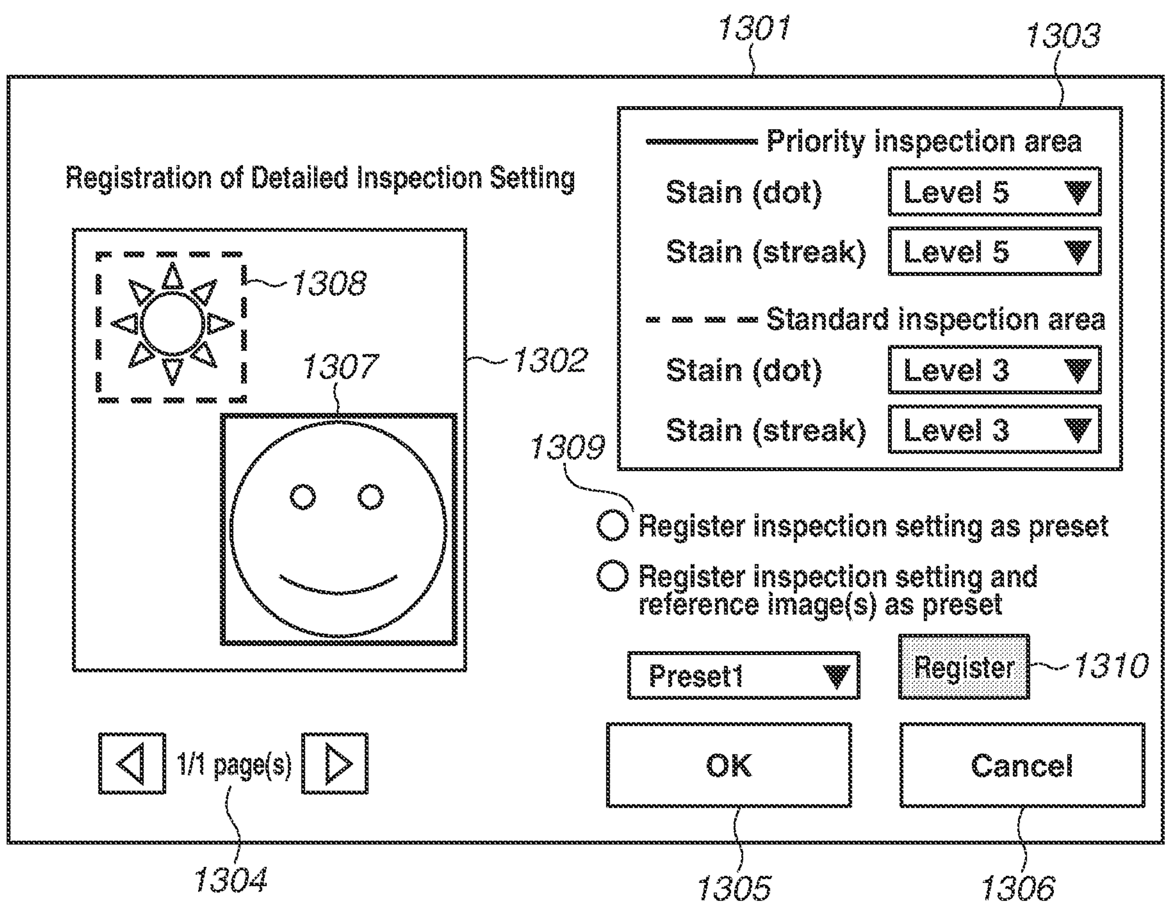
FIG. 11 illustrates an example of an inspection setting screen displayed on the inspection apparatus.

If the user selects inspection "ON", property setting is then performed. As employed herein, a print job for which inspection "on" is selected will be referred to be an "inspection job". A method for setting the areas to be inspected and the inspection levels thereof is selected in an inspection target setting section 1003. If "Default" is selected, the inspection apparatus 0108 performs inspection at a standard level over the entire reference images. If "Preset1" to "Preset5" are selected, the inspection apparatus 0108 performs inspection based on reference images and inspection settings stored in the storage unit 0228 of the inspection apparatus 0108 in advance. As illustrated in FIG. 10A, a preset can store an inspection setting and reference images in combination. If only an inspection setting is stored like Preset5, inspection is performed by using the print data of the inspection job to be subsequently submitted as reference images and applying the preset inspection setting to the reference images. If the print button 1007 is pressed, the inspection job is submitted from the information processing apparatus 0109 to the inspection apparatus 0108. With the inspection job submitted, the CPU 0226 of the inspection apparatus 0108 reads one of "Preset1" to "Preset5" specified by the inspection job from the storage unit 0228, and performs inspection. If "New registration" is selected in the inspection target setting section 1003, the inspection job is submitted from the information processing apparatus 0109 to the inspection apparatus 0108, and the CPU 0226 of the inspection apparatus 0108 uses the print data of the inspection job as reference images. Accepting a reference image, the inspection apparatus 0108 displays an inspection setting screen 1301 illustrated in FIG. 11 on the display unit 0245. The inspection apparatus 0108 accepts a new inspection setting for the reference image from the user via the displayed inspection setting screen 1301. The inspection apparatus 0108 performs inspection based on the new inspection setting. FIG. 11 will be described in detail below.

FIG. 10A illustrates a case where a combination of a reference image and an inspection setting is set for each preset. Alternatively, as illustrated in FIG. 10B, inspection settings and reference images can be stored as separate presets, and the presets can be independently specified like presets 1008 and 1009 in FIG. 9B. If presets are specified for an inspection setting and a reference image separately, the CPU 0226 of the inspection apparatus 0108 reads the specified inspection setting preset and reference image preset from the storage unit 0228, and performs inspection. If a preset or "Default" is specified for an inspection setting and "New registration" is specified for reference images, the CPU 0226 of the inspection apparatus 0108 performs inspection by using the print data of the inspection job as the reference images and applying the specified inspection setting to the reference images. If a preset is specified for the reference images and "New registration" is specified for the inspection setting, the CPU 0226 of the inspection apparatus 0108 reads the specified reference images, displays the reference images on the display unit 0245, and requests the user to input an inspection setting.

When "Default" or one of "Preset1" to "Preset5" is selected in the inspection target setting section 1003 and the print button 1007 is pressed, the inspection apparatus 0108 does not display the inspection setting screen 1301. If the print button 1007 of the inspection method selection section 1001 is pressed by a user operation and the inspection apparatus 0108 completes the acceptance of the reference images, the inspection apparatus 0108 starts inspection control without accepting other additional operations for inspection setting from the user. If "Default", a preset including no reference image, or "New registration" is selected, the inspection apparatus 0108 performs reference image registration. If a preset including reference images is selected, the inspection apparatus 0108 starts inspection control without performing processing for registering new reference images.

In an inspection operation setting section 1004, a combination of the registration of reference images with the print operation of the main print job is selected. If "Only registration" is selected, the inspection apparatus 0108 only registers reference images and makes an inspection setting thereof. If "Only printing" is selected, the printing apparatus 0101 performs printing using reference images registered in advance and the inspection apparatus 0108 performs inspection. If "Only printing" is selected in the inspection operation setting section 1004, the inspection mode setting section 1002 is grayed out to not accept input from the user. If "Registration & printing" is selected, the foregoing "Only registration" operation and the "Only printing" operation are performed in succession.

If the setting in the inspection target setting section 1003 is one including an inspection setting and reference images like "Preset1" to "Preset4", "Only printing" is made selectable while "Only registration" and "Registration & printing" are grayed out and not selectable. If the setting in the inspection target setting section 1003 is one including only an inspection setting like "Preset5" and "Default", "Only registration" and "Registration & printing" are selectable while "Only printing" is grayed out and not selectable, since there is no reference image specified. If the setting in the inspection target setting section 1003 is "New registration", "Only registration" and "Registration & printing" are selectable while "Only printing" is grayed out and not selectable.

If "Scan inspection" is selected in the inspection method selection section 1005, the inspection apparatus 0108 uses the scanned images of the print product as the reference images for inspection. If "RIP inspection" is selected, the inspection apparatus 0108 uses RIP images for the printing apparatus 0101 to use in printing as the reference images. The processing for generating and storing the reference images is as described with reference to the flowchart of FIG. 5.

If a preset including no reference image is selected in the inspection target setting section 1003, a checkbox 1006 about whether to register reference images in the preset setting is selectable. If the checkbox 1006 is checked, which preset to register reference images in is also set. If the checkbox 1006 is checked, the inspection apparatus 0108 registers the data on the print job transmitted from the information processing apparatus 0109 as reference images at the specified preset number. If "New registration" or a preset including reference images is selected in the inspection target setting section 1003, the checkbox 1006 is grayed out and not enterable.

Finally, if the print button 1007 is pressed, printing and/or inspection operations are performed based on the settings input in the sections 1002 to 1006. Details of the printing and/or inspection operations depending on the settings will be described below with reference to FIGS. 7 and 8.

A display of the inspection setting screen 1301 by the inspection apparatus 0108 and user operations will be outlined with reference to FIG. 11. FIG. 11 illustrates a screen displayed in a case where "Default", a preset including no reference image, or "New registration" has been selected, or if "New registration" is selected in the inspection target setting section 1003.

The inspection setting screen 1301 is an example of an inspection setting screen that the inspection apparatus 0108 displays to the user. This inspection setting screen 1301 is displayed on the display unit 0245 of the inspection apparatus 0108 and operated by the user. A preview area 1302 displays a reference image generated according to the flowchart of FIG. 5. In an inspection area setting section 1303, the inspection level or inspection accuracy with respect to each inspection area can be changed. The higher the set inspection level, the slighter difference between the reference image and the print product the inspection apparatus 0108 determines to be a defect. The levels of the defects to be detected can be changed depending on the type of inspection area, such as a priority inspection area and a standard inspection area. Aside from the examples cited here, an inspection exempt area where no inspection is performed can be added as an area type. The inspection level of the priority inspection area is typically set to be higher than that of the standard inspection area, whereas such settings are not restrictive. Examples of the defects here include a circular defect (stain [dot]) and a streak defect (stain [streak]). A circular defect refers to a state where only the scanned image of the print product is found to include a circular stain by comparison between the reference image and the scanned image of the print product. A streak defect refers to a state where only the scanned image of the print product is found to include a streak-like or linear stain. Such defects are just examples, and the types of defects detectable by the inspection apparatus 0108 are not limited thereto.

A page number display section 1304 can switch the image to be displayed when there is a plurality of reference images. An OK button 1305 is a button for registering the areas set for the reference image. A cancel button 1306 is a button for giving an instruction to abort the inspection job. Radio buttons in a preset number selection section 1309 and a preset registration button 1310 are buttons intended to register the inspection setting or a combination of the inspection setting and the reference image(s) as a preset.

Figure 12:
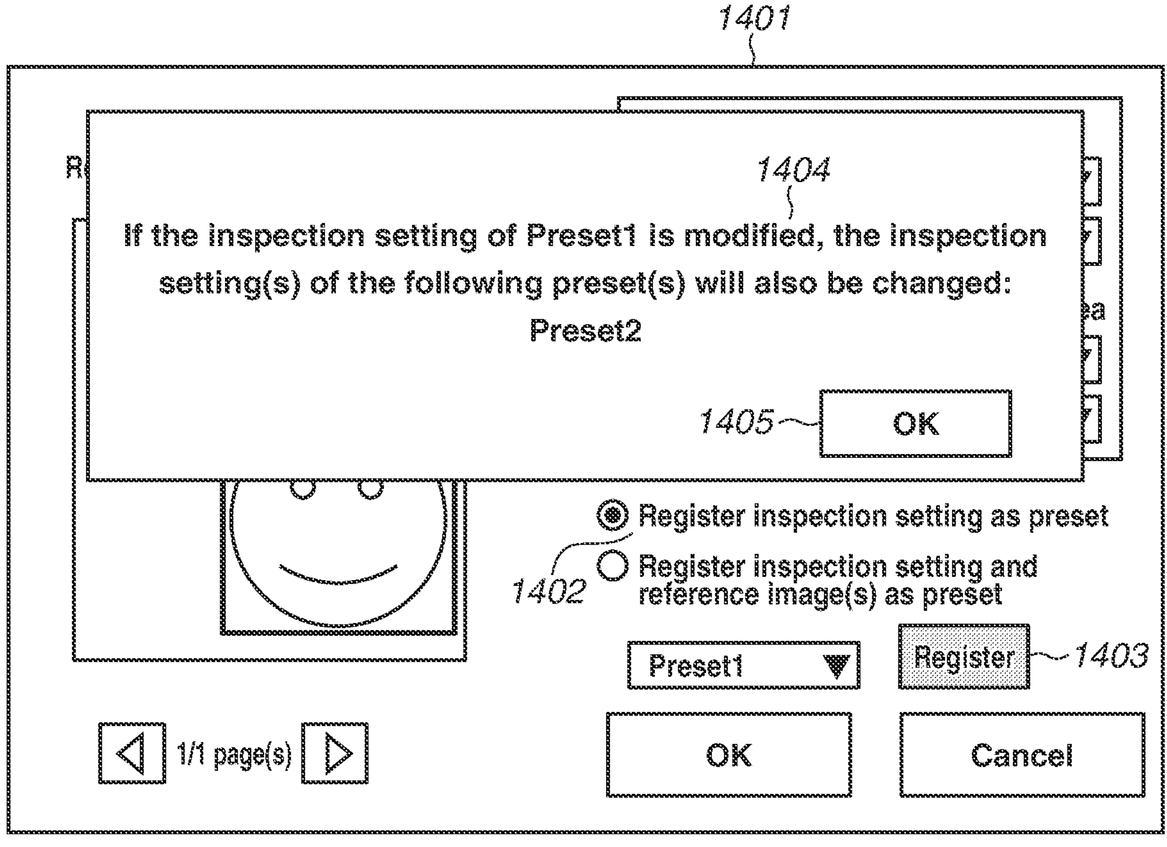
FIG. 12 illustrates an example of a confirmation screen displayed on the inspection apparatus.

An example of user operations on the inspection setting screen 1301 and how to reflect the user operations on the inspection setting screen 1301 will now be described. If a type of inspection area is selected in the inspection area setting section 1303 and an area is specified in the preview area 1302, the inspection apparatus 0108 inspects the specified area. Examples of the method for area specification include input using a mouse cursor. However, the input form is not limited in particular. The user can also change the inspection levels in the inspection area setting section 1303. FIG. 12 illustrates an example where the inspection levels of the priority inspection area are set to 5, and those of the standard inspection area to 3. Areas 1307 and 1308 are examples of area specification. The area 1307 is an example of setting of a priority inspection area, and the area 1308 a standard inspection area. In the diagram, the priority inspection area is illustrated in a solid line, and the standard inspection area in a broken line. Alternatively, the area types can be indicated by line colors or background colors. Such area specification can be omitted for pages that do not need to be inspected. An area can also be specified over an entire page without subdivision. Inspection areas can be set for all the pages by switching the displayed image using the page number display section 1304. If the OK button 1305 is selected after the completion of the inspection area specification, the CPU 0226 transmits a reference image registration completion notification to the information processing apparatus 0109. If the cancel button 1306 is selected, the inspection apparatus 0108 closes the inspection setting screen 1301 without registering an inspection setting.

If "Preset5" including no reference image is selected and the inspection setting is changed on the inspection setting screen 1301, a screen notifying that "Preset5" is modified can be displayed. A screen for inquiring of the user whether to overwrite the inspection setting of Preset5 can also be displayed in addition to the notification.

The operation during preset setting registration, which has been mentioned in the description of FIGS. 9A, 9B, and 11, will be described again. A preset includes reference images and/or an inspection setting registered by the user in advance. There are two methods for registering a preset, namely, a method for making settings from the information processing apparatus 0109 and a method for making settings using the inspection apparatus 0108.

In the case of registration from the information processing apparatus 0109, the inspection setting of a preset is performed by checking the checkbox 1006 about whether to register reference images in the preset setting, displayed on the job property setting screen of the information processing apparatus 0109. If the inspection apparatus 0108 receives a print job where the checkbox 1006 is ON from the information processing apparatus 0109, the inspection apparatus 0108 registers the data on the print job as reference images at the specified preset number.

Here, if other reference images and/or inspection setting is/are already stored in the preset, the inspection apparatus 0108 can have the user input the determination as to whether to overwrite the preset. In the screen examples illustrated in FIGS. 9A and 9B, only whether to register reference images in a preset is described to be set. However, whether to register an inspection setting can be specifiable.

In the case of registration using the inspection apparatus 0108, the inspection setting of a preset can be registered when "New registration" is selected in the inspection target setting section 1003. Alternatively, inspection areas and inspection levels can be registered without reference images, or inspection settings can be stored in the inspection apparatus 0108 in advance without a user input. The preset registration method illustrated in FIG. 11 is just an example and not restrictive. An operation for registering a preset will now be described. When the user selects "New registration" in the inspection target setting section 1003, the inspection settings of "Preset1" to "Preset5" can be registered in the inspection apparatus 0108 aside from the inspection setting described with reference to FIG. 11. The user selects whether to register only an inspection setting as a preset or register a combination of an inspection setting and reference images as a preset, using the radio buttons in the preset number selection section 1309. If a number to register the preset is selected, the preset registration button 1310 becomes selectable. The preset registration button 1310 is grayed out and not selectable by the user until one of the preset numbers is selected in the preset number selection section 1309.

If the user selects the radio button to register only an inspection setting as a preset and presses the preset registration button 1310, the currently set inspection areas and inspection levels are stored in the storage unit 0228. If the user selects the radio button to register a combination of an inspection setting and reference images as a preset and presses the preset registration button 1310, the currently set inspection areas and inspection levels are stored in the storage unit 0228 along with the reference images. If the number of an already registered preset is selected in the preset number selection section 1309 and the preset registration button 1310 is pressed, the inspection setting stored in the storage unit 0228 is overwritten. Here, the user can be prompted to input the determination as to whether to overwrite the preset. While FIG. 11 illustrates, as an example, the radio button to register an inspection setting as a preset and the radio button to register a combination of an inspection setting and reference images as a preset, the options to be selected using radio buttons are not limited thereto. A radio button to register reference images as a preset and a radio button to register an inspection setting and reference images as separate presets can also be provided.

Figure 7:
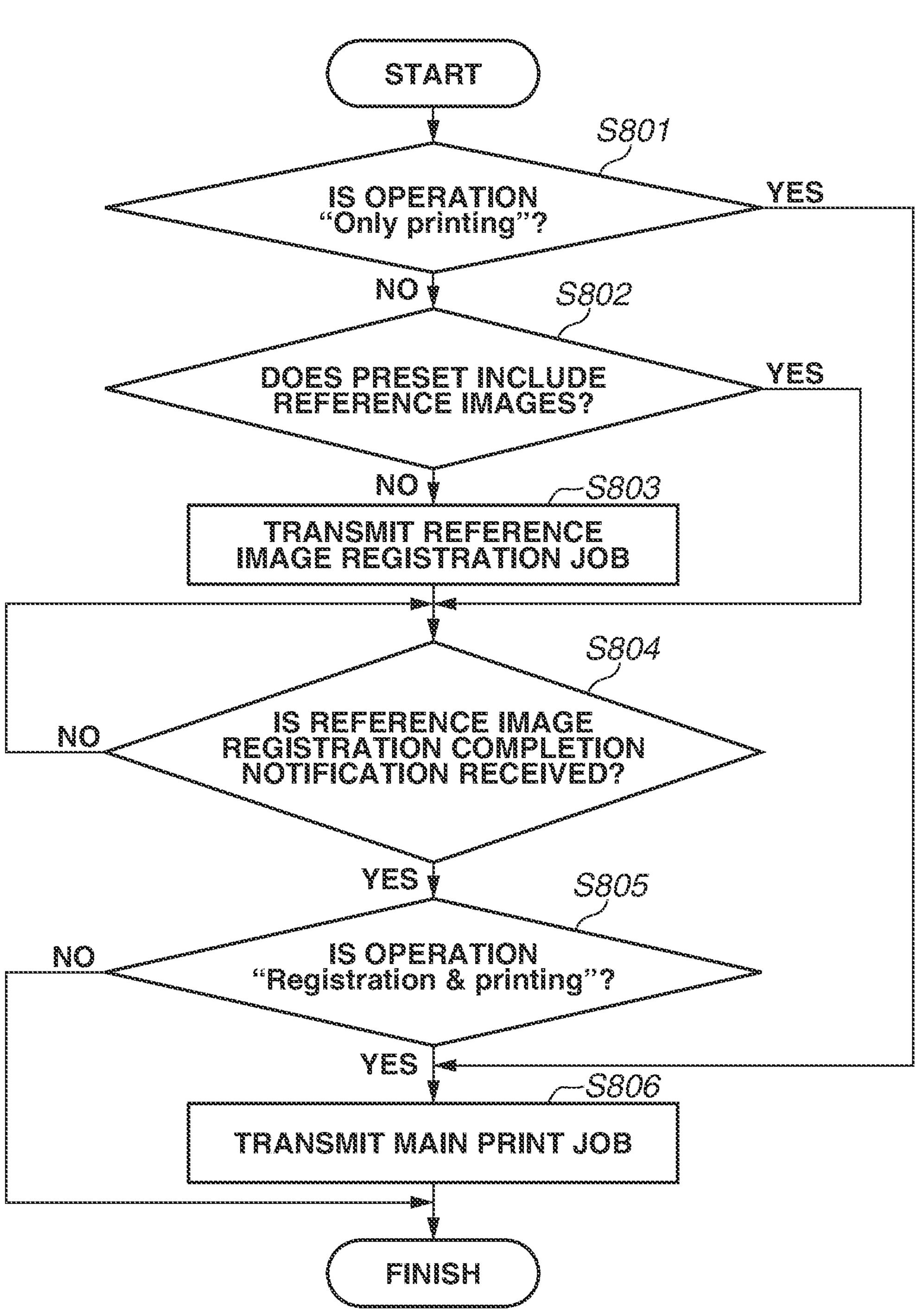
FIG. 7 is an example of an inspection operation flowchart of the information processing apparatus according to the exemplary embodiment.

An operation when the information processing apparatus 0109 performs an inspection job will be described with reference to the flowchart of FIG. 7. The user executes a print job that is set to inspection "ON" in the inspection mode setting section 1002. In step S801, the CPU 0234 determines the operation set in the inspection operation setting section 1004. If the setting in the inspection operation setting section 1004 is "Only registration" or "Registration & printing" (NO in step S801), the processing proceeds to step S802. If the setting is "Only printing" (YES in step S801), the processing proceeds to step S806. In step S802, the information processing apparatus 0109 determines whether the preset selected in the inspection target setting section 1003 of the inspection method selection section 1001 is one including reference images. If the preset includes reference images (YES in step S802), the processing proceeds to step S804. If the preset does not include a reference image or the preset is "Default" or "New registration" (NO in step S802), the processing proceeds to step S803. In step S803, the information processing apparatus 0109 transmits a reference image registration job to the printing apparatus 0101. The processing proceeds to step S804.

If "scan inspection" is selected in the inspection method selection section 1005, the reference image registration job is a single- or multi-copy print job. The information processing apparatus 0109 transmits the single-copy print job to the printing apparatus 0101. The printing apparatus 0101 performs a print operation and imaging, and then transmits captured images to the inspection apparatus 0108. If "RIP inspection" is selected in the inspection method selection section 1005, the reference image registration job is a job for registering RIP images generated by the printing apparatus 0101 prior to printing as reference images. Unlike the scan inspection, printing and imaging operations are not performed in registering the RIP images as reference images. The information processing apparatus 0109 transmits the RIP images for the printing apparatus 0101 to use in printing to the inspection apparatus 0108.

After the transmission of the reference image registration job to the printing apparatus 0101 in step S803, the inspection apparatus 0108 accepts the inspection level settings made by the user for respective inspection areas of the reference images as described with reference to FIGS. 11 and 12. Since the inspection apparatus 0108 performs inspection by comparing the reference images and the captured images of the print product based on the settings, the information processing apparatus 0109 does not start but keeps the main print job on standby until the setting of the inspection conditions (inspection setting) ends. Even if an inspection setting and reference images already stored in the inspection apparatus 0108 are specified as a preset, the information processing apparatus 0109 waits for the inspection apparatus 0108 to read such settings. In step S804, the CPU 0234 therefore waits for the reception of a reference image registration completion notification from the inspection apparatus 0108 without transmitting the main print job to the printing apparatus 0101. If the CPU 0234 receives the reference image registration completion notification (YES in step S804), the processing proceeds to step S805. In step S805, the CPU 0234 determines the operation set in the inspection operation setting section 1004. If the operation set in the inspection operation setting section 1004 is "Registration & printing" (YES in step S805), the processing proceeds to step S806. If the set operation is "Only registration" (NO in step S805), the processing ends. In step S806, the CPU 0234 transmits the main print job to the printing apparatus 0101. The processing ends.

The main print job is transmitted through the same processing regardless of the inspection method selected in the inspection method selection section 1001. When the main print job is transmitted from the information processing apparatus 0109 to the printing apparatus 0101, the printing apparatus 0101 performs a print operation, and the imaging unit 0218 captures images of the printed sheet(s). The captured images are then transmitted to the inspection apparatus 0108. The inspection apparatus 0108 compares the captured images of the print product with the reference images, and performs inspection based on the inspection setting made on the job property setting screen.

An operation when the inspection apparatus 0108 performs an inspection job will be described with reference to the flowchart of FIG. 8. In step S901, the CPU 0226 accepts the inspection operation set in the inspection operation setting section 1004. If the inspection operation is "Only registration" or "Registration & printing" (NO in step S901), the processing proceeds to step S902. If the inspection operation is "Only printing" (YES in step S901), the processing proceeds to step S912. As also described with reference to FIGS. 9A and 9B, if the inspection operation is "Only printing", no setting is accepted in the inspection target setting section 1003. In such a case, the inspection setting with respect to the reference images is determined in advance by operations similar to those described below in steps S907 to S909.

In step S902, the CPU 0226 determines whether a preset including reference images is selected in the inspection target setting section 1003 of the information processing apparatus 0109. Such information is included in the inspection job transmitted from the information processing apparatus 0109. If a preset including reference images is selected (YES in step S902), the processing proceeds to step S906. If a preset including no reference image, "Default" or "New registration" is selected (NO in step S902), the processing proceeds to step S903.

In step S903, the CPU 0226 receives reference images generated according to the flowchart of FIG. 5 from the printing apparatus 0101, and stores the reference images into the storage unit 0228. In step S904, the CPU 0226 determines whether the checkbox 1006 about whether to register reference images in the preset setting specified in the inspection target setting section 1003 of the information processing apparatus 0109 is checked. Such information is also included in the settings of the inspection job transmitted from the information processing apparatus 0109. If the inspection job includes a setting to register reference images in the preset (YES in step S904), the processing proceeds to step S905. In step S905, the CPU 0226 registers the reference images in the specified preset. If other settings are already made in the specified preset, the CPU 0226 can display a warning about whether to overwrite the preset to the user.

In step S906, the CPU 0226 accepts the inspection target set in the inspection target setting section 1003. If the inspection target set in the inspection target setting section 1003 is "New registration" (YES in step S906), the processing proceeds to step S907. If the inspection target is "Default" or a preset (NO in step S906), the processing proceeds to step S913. In step S907, the CPU 0226 displays the inspection setting screen 1301 on the display unit 0245. In such a case, the information processing apparatus 0109 temporarily holds the main print job inside without transmitting the main print job to the printing apparatus 0101 (standby state). In step S908, the CPU 0226 accepts an inspection setting from the user via the display unit 0245. The processing of step S908 is repeated until the CPU 0226 accepts the user's pressing of the OK button 1305 on the display unit 0245 in step S909. If the pressing of the OK button 1305 is accepted (YES in step S909), the processing proceeds to step S910. The CPU 0226 here stores the reference images on which the inspection setting is reflected into the storage unit 0228. If the pressing of the cancel button 1306 is accepted instead of the OK button 1305, the inspection apparatus 0108 discards the reference images received in step S903 from the storage unit 0228. If there is an inspection job kept in the standby state in the information processing apparatus 0109, the inspection apparatus 0108 transmits a cancel notification to the information processing apparatus 0109. Receiving the cancel notification, the information processing apparatus 0109 cancels the inspection job kept in the standby state in the information processing apparatus 0109, and ends the processing. In step S910, the CPU 0226 transmits a registration completion notification to the information processing apparatus 0109.

In step S911, the CPU 0226 accepts the inspection operation set in the inspection operation setting section 1004. If the inspection operation set in the inspection operation setting section 1004 is "Registration & printing" (YES in step S911), the processing proceeds to step S912. If the inspection operation is "Only registration" (NO in step S911), the processing ends.

In step S906, if the inspection target set in the inspection target setting section 1003 is "Default" or one of "Preset1" to "Preset5" is selected (NO in step S906), the processing proceeds to step S913. The setting "Default" in the inspection target setting section 1003 is an inspection setting where the inspection apparatus 0108 specifies the standard inspection level over the entire areas of the reference images. The CPU 0226 reflects the inspection setting on the reference images. The settings "Preset1" to "Preset5" in the inspection target setting section 1003 are inspection settings where the inspection apparatus 0108 specifies the set inspection areas and inspection levels for reference images, and can include the reference images. The inspection settings and reference images of "Preset1" to "Preset5" are stored in the storage unit 0228 of the inspection apparatus 0108, read into the RAM 0227, and reflected on the reference images by the CPU 0226. The six inspection settings of "Default" and "Preset1" to "Preset5" can be completed without a user input as described with reference to FIGS. 11 and 12. In step S913, the CPU 0226 stores the reference images on which the inspection setting is reflected into the storage unit 0228. In step S910, the CPU 0226 transmits a registration completion notification to the information processing apparatus 0109. The CPU 0226 can be configured to only register reference images even if the inspection target set in the inspection target setting section 1003 is "Default" or one of "Preset1" to "Preset5" is selected. In step S911, the CPU 0226 accepts the inspection operation set in the inspection operation setting section 1004. If the inspection operation set in the inspection operation setting section 1004 is "Registration & printing" (YES in step S911), the processing proceeds to step S912. If the inspection operation is "Only registration" (NO in step S911), the processing ends.

As described above, according to present exemplary embodiment, inspection can be performed without operating the inspection setting screen 1301 if the inspection is performed using a predetermined inspection setting and/or predetermined reference images like "Default" and the presets. Since the inspection settings of past inspection jobs to be reused and inspection settings to be frequently used can be stored as presets, similar operations do not need to be repeated again and again. Since not only inspection settings but reference images can also be registered as presets, inspection can be started without a need to select a desired inspection target from a job history or a reference image list in repeating the inspection. Moreover, if a preset including reference images is specified, new reference images do not need to be generated, and the processing of step S903 can be omitted for improved processing speed. This can provide the effect of improving the operability of the user using the inspection apparatus 0108.

Now, suppose that presets like those of FIG. 10A described in the foregoing exemplary embodiment are stored in the storage unit 0228 of the inspection apparatus 0108. If an inspection setting or reference images are registered or edited in a preset, other presets related to the modification can also be affected. If the user registers or edits an inspection setting or reference images in a preset and there is any preset related thereto, the inspection apparatus 0108 therefore controls notification of the presence of the related preset(s) to the user.

FIG. 12 illustrates an example of a notification screen. In FIG. 10A, Preset1 and Preset2 include the same inspection setting. If the user presses a registration button 1403 to register an inspection setting in Preset1 in such a state, the inspection apparatus 0108 displays a warning 1404 illustrated in FIG. 12. The warning 1404 displays the names of all the presets to be affected by the modification of the inspection setting of Preset1. Here, Preset2 including the same inspection setting is displayed.

In FIG. 12, the warning 1404 is described to be issued at the timing of registration or modification of the preset. However, a notification that an item related to a preset has been edited can be issued when the preset is selected at the timing of submission of the inspection job.

As described above, the warning displayed by the inspection apparatus 0108 can notify the user of the presence of a preset or presets to be affected, and the user can determine whether to continue the registration in the preset.

Exemplary embodiments of the present disclosure can be implemented by performing the following processing. The processing includes supplying software (program) for implementing the functions of the foregoing exemplary embodiment to a system or an apparatus via a network or various storage media, and reading and executing the program by a computer (or CPU or microprocessing unit [MPU]) of the system or apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-120176, filed Jul. 28, 2022, which is hereby incorporated by reference herein in its entirety.

What is claimed is:

1. An inspection system comprising at least an inspection apparatus and an information processing apparatus communicably connected to each other,
- wherein the information processing apparatus includes first one or more processors configured to cause the information processing apparatus to:
- transmit, from the information processing apparatus to the inspection apparatus, a request to perform at least one of a registration operation and an inspection operation,
- wherein the inspection apparatus includes at least one memory and a controller including second one or more processors, the controller configured to cause the inspection apparatus to:
- store, in the at least one memory, one or more inspection settings and one or more reference images, the one or more inspection settings including a first inspection setting, the one or more reference images including a first reference image;
- receive, from the information processing apparatus, the request to perform at least one of the registration operation and the inspection operation;
- determine whether the request includes both an instruction for the registration operation and an instruction for the inspection operation; and
- in response to the request:
  - when the request is determined to include the instruction for the inspection operation and not include the instruction for the registration operation, perform first operations including:
    - reading first data included with the request, the first data specifying the first inspection setting and the first reference image stored in the at least one memory;

receiving a first scanned image obtained by scanning a first print product; and inspecting the first scanned image based on the first inspection setting and the first reference image specified by the first data;

when the request is determined to include the instruction for the registration operation and not include the instruction for the inspection operation, perform second operations including:

setting a second inspection setting on a second reference image; and storing, in the at least one memory, the second reference image and the second inspection setting based on second data included with the request; and when the request is determined to include both the instruction for the registration operation and the instruction for the inspection operation, perform third operations including:

performing the second operations;

receiving a second scanned image obtained by scanning a second print product; and inspecting the second scanned image based on the second inspection setting and the second reference image, the second inspection setting having been set on the second reference image by the performing the second operations.

2. The inspection system according to claim 1, wherein the information processing apparatus includes a display, and wherein, if an instruction to include the second data with the request is received from a user via a screen displayed on the display, the second data is included in the request transmitted to the inspection apparatus.

3. The inspection system according to claim 1, wherein the first data is data for specifying the first reference image and the first inspection setting associated with the first reference image from among the one or more inspection settings and the one or more reference images stored in the at least one memory.

4. The inspection system according to claim 1, wherein the first data includes data for specifying the first inspection setting from among the one or more inspection settings stored in the at least one memory and data for specifying the first reference image from among the one or more reference images.

5. The inspection system according to claim 1, wherein the controller is configured to store the first reference image and the first inspection setting in combination.

6. The inspection system according to claim 1, wherein the controller is configured to store the first reference image and the first inspection setting separately in the at least one memory.

7. The inspection system according to claim 1, wherein the controller is further configured to cause the inspection apparatus to:

accept an inspection setting of an inspection job from a user; and if content of the first inspection setting specified by the first data is modified by the inspection setting of the inspection job, issue a notification that the first inspection setting is modified.

8. The inspection system according to claim 7, wherein the inspection apparatus includes a display, and wherein the controller is further configured to cause the inspection apparatus to:

display, on the display, an instruction object enabling a user to register, in the at least one memory, the inspection setting of the inspection job as a preset by an operation on the instruction object; and control registration of the inspection setting of the inspection job as the preset based on receiving the operation on the instruction object.

9. The inspection system according to claim 1, wherein the controller is configured to register the one or more inspection settings and the one or more reference images in the at least one memory as a preset.

10. A method for controlling an inspection system including at least an inspection apparatus and an information processing apparatus communicably connected to each other, the inspection apparatus including at least one memory, the method comprising:

storing, in the at least one memory, one or more inspection settings and one or more reference images, the one or more inspection settings including a first inspection setting, the one or more reference images including a first reference image;

transmitting, from the information processing apparatus to the inspection apparatus, a request to perform at least one of a registration operation and an inspection operation;

at the inspection apparatus:

receiving, from the information processing apparatus, the request to perform at least one of the registration operation and the inspection operation;

determining whether the request includes both an instruction for the registration operation and an instruction for the inspection operation; and in response to the request:

when the request is determined to include the instruction for the inspection operation and not include the instruction for the registration operation, performing first operations including:

reading first data included with the request, the first data specifying the first inspection setting and the first reference image stored in the at least one memory;

receiving a first scanned image obtained by scanning a first print product; and inspecting the first scanned image based on the first inspection setting and the first reference image specified by the first data;

when the request is determined to include the instruction for the registration operation and not include the instruction for the inspection operation, performing second operations including:

setting a second inspection setting on a second reference image; and storing, in the at least one memory, the second reference image and the second inspection setting based on second data included with the request; and when the request is determined to include both the instruction for the registration operation and the instruction for the inspection operation, performing third operations including:

performing the second operations;

receiving a second scanned image obtained by scanning a second print product; and inspecting the second scanned image based on the second inspection setting and the second reference image, the second inspection setting having been set on the second reference image by the performing the second operations.

* * * * *